(12) United States Patent
Lu et al.

(10) Patent No.: US 11,881,605 B2
(45) Date of Patent: Jan. 23, 2024

(54) LOW-TEMPERATURE AQUEOUS REDOX FLOW BATTERY

(71) Applicant: The Chinese University of Hong Kong, Hong Kong (CN)

(72) Inventors: Yi-Chun Lu, Hong Kong (CN); Fei Ai, Chengdu (CN)

(73) Assignee: The Chinese University of Hong Kong, Hong Kong (CN)

( * ) Notice: Subject to any disclaimer, the term of this patent is extended or adjusted under 35 U.S.C. 154(b) by 45 days.

(21) Appl. No.: 17/681,016

(22) Filed: Feb. 25, 2022

(65) Prior Publication Data

US 2023/0275247 A1 Aug. 31, 2023

(51) Int. Cl.
*H01M 8/08* (2016.01)
*H01M 8/18* (2006.01)

(52) U.S. Cl.
CPC ............ *H01M 8/08* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 2020/0168938 A1* | 5/2020 | Fleck | H01M 8/188 |
| 2021/0032762 A1* | 2/2021 | Cronin | H01M 12/08 |

OTHER PUBLICATIONS

Chen et al., "Highly reduced and protonated aqueous solutions of $[P_2W_{18}O_{62}]^{6-}$ for on-demand hydrogen generation and energy storage," *Nature Chemistry* 10:1042-1047, Oct. 2018.
Herranz et al., "Using Rotating Ring Disc Electrode Voltammetry to Quantify the Superoxide Radical Stability of Aprotic Li-Air Battery Electrolytes," *J. Phys. Chem.* 116:19084-19094, 2012.
Liu et al., "A Total Organic Aqueous Redox Flow Battery Employing a Low Cost and Sustainable Methyl Viologen Anolyte and 4-HO-Tempo Catholyte," *Adv. Energy Mater.* 6:1501449, 2016, 8 pages.
Mbomekalle et al., "Simple, high yield and reagent-saving synthesis of pure $\alpha$-$K_6P_2W_{18}O_{62}$ $14H_2O$," *Inorganic Chemistry Communications* 7:86-90, 2004.
Sadakane et al.,"Electrochemical Properties of Polyoxometalates as Electrocatalysts," *Chem. Rev.* 98:219-237, 1998.
Sum et al., "A Study of the V(II)/V(III) Redox Couple for Redox Flow Cell Applications," *Journal of Power Sources* 15:179-190, 1985.

\* cited by examiner

*Primary Examiner* — Scott J. Chmielecki
(74) *Attorney, Agent, or Firm* — Seed IP Law Group LLP

(57) ABSTRACT

Provided is an aqueous redox flow battery comprising a positive electrode, a negative electrode, a posolyte chamber containing a posolyte, a negolyte chamber containing a polyoxometalate as a negolyte, and a separator disposed between the posolyte chamber and the negolyte chamber, wherein the polyoxometalate has a conductivity of 65 mS $cm^{-1}$ or more at $-20°$ C., and the aqueous redox flow battery has a power density of 250 mW $cm^{-2}$ or more at $-20°$ C.

19 Claims, 9 Drawing Sheets

LOW-TEMPERATURE AQUEOUS REDOX FLOW BATTERY

TECHNICAL FIELD

The present disclosure is directed to an aqueous redox flow battery, and in particular, to an aqueous redox flow battery with a high power density at a low temperature.

BACKGROUND

Renewable power generations such as solar and wind power are under rapid development in response to environmental concerns of fossil fuels. Stationary energy storage is a critical component in grid modernization as it effectively mitigates output fluctuations for intermittent renewable energy resource. Aqueous redox-flow batteries (ARFBs) are a promising energy storage technology, in which electrical energy is stored in two redox-active species with distinct redox potentials dissolved in the electrolyte tanks. This not only permits decoupling of the energy (electrolyte volume and concentration) and power (size of reaction area) but renders high safety of ARFBs.

Stable and high-power operation of the ARFBs in extreme cold climate regions is prohibited by the freezing of aqueous electrolytes, sluggish kinetics, and limited solubility, which limits the market penetration of ARFBs. The state-of-the-art vanadium redox flow batteries (VRFBs) perfonns poorly at decreasing temperatures, such as lower solubility, lower redox kinetics etc. A handful of reports studied the low-temperature properties of the vanadium redox flow battery and attempted to improve the low-temperature VRFBs performance (5° C.) by additives. However, the low solubility and sluggish kinetics of the $V^{2+}/V^{3+}$ negolyte below 0° C. still represents a critical challenge to employ VRFBs at low temperatures.

Low-temperature studies on other types of ARFBs are very limited. Most of organic ARFBs suffer from low energy density, strict operation condition, and self-decomposition under room temperature. Polysulfide-based ARFBs offer high electron solubility (~8 mol $L^{-1}$) but suffer from cross-over and poor kinetics even at room temperature. Zinc-iodide ARFBs can lower down the operating temperature to −20° C. by mixing with organic electrolyte (e.g. ethanol and dimethyl fonnamide). However, such approach suffers from large resistance at −20° C., resulting in the low current density (10 mA $cm^{-2}$), limited capacity/cycle life (~8 Ah $L^{-1}$ in 150 cycles) and large energy loss (voltage efficiency ~66.7% and ~30% at 10 mA $cm^{-2}$ and 20 mA $cm^{-2}$, respectively). Polyoxometalates are well-known to accomnmodate multiple electrons without structural changes and have been applied to catalyst and energy storage systems (e.g. ARFBs). In addition, the abundant oxygen atoms on the surface of polyoxometalates would interact with hydrogen atoms of the water molecules, which could reduce the H-bonds between water molecules and depress the freezing point of electrolyte. Unfortunately, most polyoxometalate-based ARFBs achieved limited volumetric capacity (below 15 Ah $L^{-1}$) due to low demonstrated concentrations (80 mM ~0.2 M) or short cycle life (below 50 cycles) at room temperature. Chen et al. recently reported using $Li_6[P_2W_{18}O_{62}]$ polyoxoanion as the negolyte in ARFBs. However, it only demonstrated 20 cycles at 100 mA $cm^{-2}$ at room temperature, which is not satisfactory for practical ARFB applications.

In view of the above, there is still a need for a high-power-density low-temperature ARFB.

SUMMARY

In one aspect, the present disclosure provides an aqueous redox flow battery, comprising a positive electrode, a negative electrode, a posolyte chamber containing a posolyte wherein at least a part of the positive electrode is immersed in a solution of the posolyte, a negolyte chamber containing a polyoxometalate with $H^+$ counter-ions as a negolyte wherein at least a part of the negative electrode is immersed in an aqueous solution of the negolyte, and a separator disposed between the posolyte chamber and the negolyte chamber, wherein the polyoxometalate has a conductivity of 65 mS $cm^{-1}$ or more at −20° C.

In some embodiments, the polyoxometalate has a conductivity of 74 mS $cm^{-1}$ or more at −20° C. In some embodiments, the polyoxometalate has a power density of 250 mW $cm^{-2}$ or more at −20° C. In some embodiments, the polyoxometalate has a power density of 280 mW $cm^{-2}$ or more at −20° C. In some embodiments, the polyoxometalate is $H_6P_2W_{18}O_{62}$.

In some embodiments, the concentration of the negolyte is 0.3 M to 0.75 M, for example, any subranges contained therein. In some embodiments, the concentration of the negolyte is 0.4 M to 0.7 M. In some embodiments, the concentration of the negolyte is 0.5 M to 0.6 M. In some embodiments, the concentration of the negolyte is 0.5 M to 0.55 M.

In some embodiments, the negolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 5 wt % to 15 wt %, for example, 8 wt % to 12 wt %, such as 10 wt %.

In some embodiments, the negolyte further comprises other polyoxometalate than $H_6P_2W_{18}O_{62}$. For example, negolyte further comprises $M_6P_2W_{18}O_{62}$, wherein $M^+$ is selected from the group consisting of $Li^+$, $Na^+$, $K^+$, and any combination thereof. In some embodiments, $H_6P_2W_{18}O_{62}$ is 50 wt % or more of total negolytes, for example, 60 wt % or more, 70 wt % or more, 80 wt % or more, 90 wt % or more, or 95 wt % or more.

In some embodiments, the posolyte is selected from the group consisting of $Fe^{2+}/Fe^{3+}$, $VO^{2+}/VO^{2+}$, $Mn^{2+}/Mn^{3+}$, $I^-/I_3^-$, $Br^-/Br_2$, $Ce^{4+}/Ce^{3+}$, and any combination thereof. In some embodiments, the concentration of the posolyte is 0.5 M to 1.8 M, for example, 0.8 M to 1.6 M, or 1 M to 1.5 M.

In some embodiments, the posolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 2 M to 5 M, for example, 3 M to 4 M.

In some embodiments, the posolyte chamber is in fluid-communication with a posolyte tank, and the negolyte chamber is in fluid-communication with a negolyte tank. In some embodiments, the separator is ion permeable membrane. In some embodiments, the separator is polyolefin based membrane, fluoropolymer based membrane, polybenzimidazole (PBI) based membrane, polyamide (PA) based membrane, polysulfone (PSU) based membrane, polymers of intrinsic microporosity (PIMs) membrane, metal organic framework (MOF) membrane, covalent organic frameworks (COF) membrane, and any combination thereof.

In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

In some embodiments, the aqueous redox flow battery of claim 1 has the lowest operation temperature of −35° C., for example, the lowest operation temperature of −30° C. or the lowest operation temperature of −25° C.

In another aspect, the present disclosure provides an energy storage system comprising an aqueous redox flow battery, wherein the aqueous redox flow battery comprises a positive electrode, a negative electrode, a posolyte chamber containing a posolyte wherein at least a part of the positive electrode is immersed in a solution of the posolyte, a negolyte chamber containing polyoxometalate with $H^+$ counter-ions as negolyte (such as $H_6P_2W_{18}O_{62}$) wherein at least a part of the negative electrode is immersed in an aqueous solution of the negolyte, and a separator disposed between the posolyte chamber and the negolyte chamber.

In some embodiments, the concentration of the negolyte is 0.3 M to 0.74 M, for example, any subranges contained therein. In some embodiments, the concentration of the negolyte is 0.4 M to 0.7 M. In some embodiments, the concentration of the negolyte is 0.5 M to 0.6 M. In some embodiments, the concentration of the negolyte is 0.5 M to 0.55 M.

In some embodiments, the negolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 5 wt % to 15 wt %, for example, 8 wt % to 12 wt %, such as 10 wt %.

In some embodiments, the negolyte further comprises $M_6P_2W_{18}O_{62}$, wherein $M^+$ is selected from the group consisting of $Li^+$, $Na^+$, $K^+$, and any combination thereof. In some embodiments, $HP_2W_{18}O_{62}$ is 50 wt % or more of total negolytes, for example, 60 wt % or more, 70 wt % or more, 80 wt % or more, 90 wt % or more, or 95 wt % or more.

In some embodiments, the posolyte is selected from the group consisting of $Fe^{2+}/Fe^{3+}$, $VO^{2+}/VO_2^+$, $Mn^{2+}/Mn^{3+}$, $I^-/I_3^-$, $Br^-/Br_2$, $Ce^{4+}/Ce^{3+}$, and any combination thereof. In some embodiments, the concentration of the posolyte is 0.5 M to 1.8 M, for example, 0.8 M to 1.6 M, or 1 M to 1.5 M.

In some embodiments, the posolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 2 M to 5 M, for example, 3 M to 4 M.

In some embodiments, the posolyte chamber is in fluid-comnmunication with a posolyte tank, and the negolyte chamber is in fluid-communication with a negolyte tank. In some embodiments, the separator Polyolefin based membrane, fluoropolymer based membrane, polybenzimidazole (PBI) based membrane, polyamide (PA) based membrane, polysulfone (PSU) based membrane, polymers of intrinsic microporosity (PIMs) membrane, metal organic framework (MOF) membrane, covalent organic frameworks (COF) membrane, and any combination thereof.

In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

In some embodiments, the aqueous redox flow battery of claim 1 has the lowest operation temperature of −35° C., for example, the lowest operation temperature of −30° C. or the lowest operation temperature of −25° C.

In other aspect, the present application provides a method for energy storage, comprising using an aqueous redox flow battery, wherein the aqueous redox flow battery comprises a positive electrode, a negative electrode, a posolyte chamber containing a posolyte wherein at least a part of the positive electrode is immersed in a solution of the posolyte, a negolyte chamber containing polyoxometalate with $H^+$ counter-ions as negolyte (such as $H_6P_2W_{18}O_{62}$) wherein at least a part of the negative electrode is immersed in an aqueous solution of the negolyte, and a separator disposed between the posolyte chamber and the negolyte chamber.

In some embodiments, the concentration of the negolyte is 0.3 M to 0.74 M, for example, any subranges contained therein. In some embodiments, the concentration of the negolyte is 0.4 M to 0.7 M. In some embodiments, the concentration of the negolyte is 0.5 M to 0.6 M. In some embodiments, the concentration of the negolyte is 0.5 M to 0.55 M.

In some embodiments, the negolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 5 wt % to 15 wt %, for example, 8 wt % to 12 wt %, such as 10 wt %.

In some embodiments, the negolyte further comprises $M_6P_2W_{18}O_{62}$, wherein $M^+$ is selected from the group consisting of $Li^+$, $Na^+$, $K^+$, and any combination thereof. In some embodiments, $H_6P_2W_{18}O_{62}$ is 50 wt % or more of total negolytes, for example, 60 wt % or more, 70 wt % or more, 80 wt % or more, 90 wt % or more, or 95 wt % or more.

In some embodiments, the posolyte is selected from the group consisting of $Fe^{2+}/Fe^{3+}$, $VO^{2+}/VO_2^+$, $Mn^{2+}/Mn^{3+}$, $I^-/I_3^-$, $Br^-/Br_2$, $Ce^{4+}/Ce^{3+}$, and any combination thereof. In some embodiments, the concentration of the posolyte is 0.5 M to 1.8 M, for example, 0.8 M to 1.6 M, or 1 M to 1.5 M.

In some embodiments, the posolyte chamber further comprises an acid supporting electrolyte. In some embodiments, the acid supporting electrolyte is selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 2 M to 5 M, for example, 3 M to 4 M.

In some embodiments, the posolyte chamber is in fluid-communication with a posolyte tank, and the negolyte chamber is in fluid-communication with a negolyte tank. In some embodiments, the separator Polyolefin based membrane, fluoropolymer based membrane, polybenzimidazole (PBI) based membrane, polyamide (PA) based membrane, polysulfone (PSU) based membrane, polymers of intrinsic microporosity (PIMs) membrane, metal organic framework (MOF) membrane, covalent organic frameworks (COF) membrane, and any combination thereof.

In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of metal, carbon felt, carbon paper, graphene sheet, conducting polymer, and any combination thereof.

In some embodiments, the aqueous redox flow battery of claim 1 has the lowest operation temperature of −35° C., for example, the lowest operation temperature of −30° C. or the lowest operation temperature of −25° C.

DESCRIPTION OF DRAWINGS

Embodiments illustrated herein are further described in the following description in conjunction with the accompanying drawings. However, the drawings are only provided to enable those skilled in the art to better understand the disclosure, rather than limit the scope of the disclosure.

measured at selected charges during cycling: first cycle (C1), 150th cycle (C150), and 200th cycle (C200) of charge) and discharge cycles (first cycle (D1), 150th cycle (D150), and 200th cycle (D200) of discharge.

Figure 14:
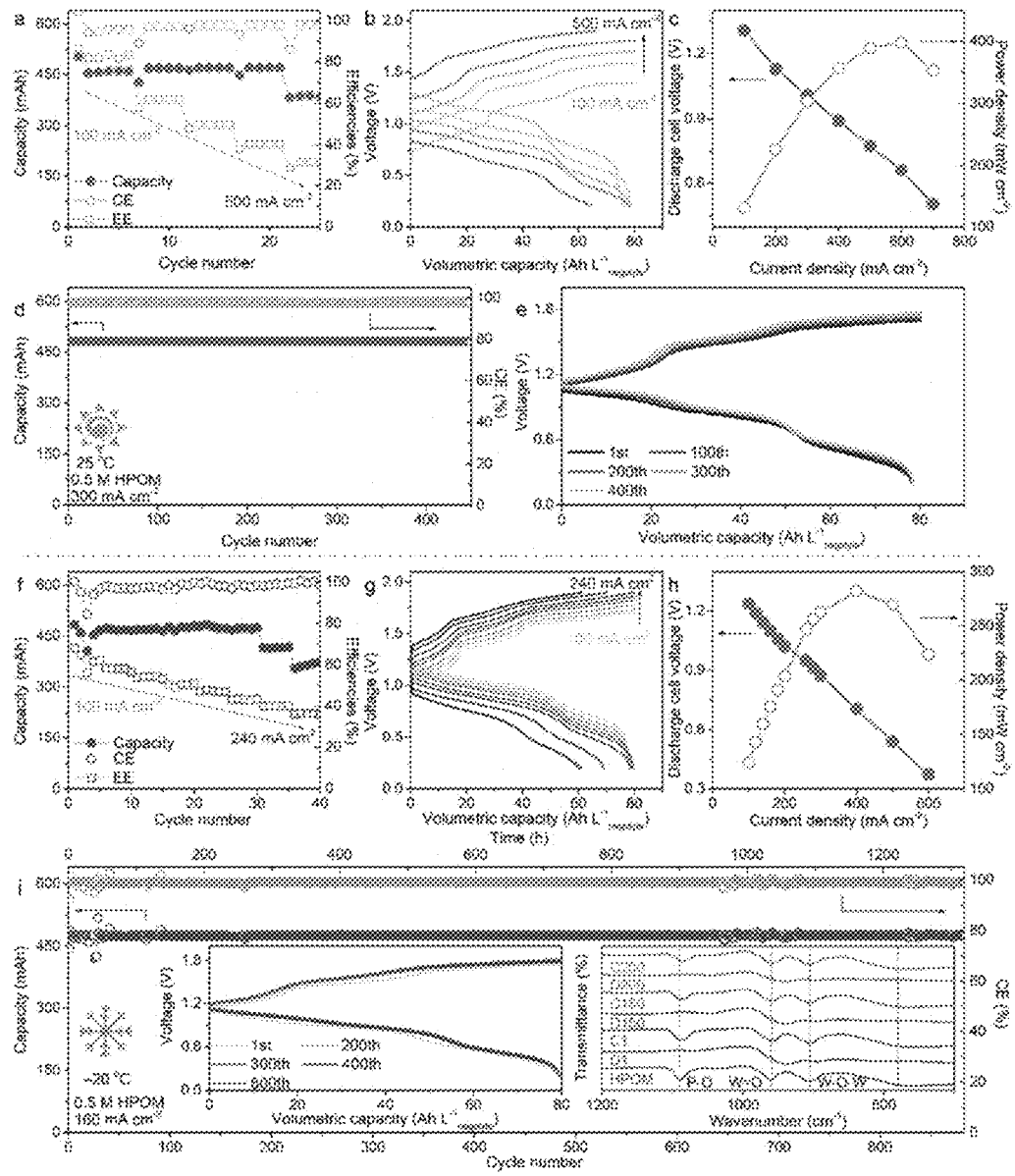
FIG. 14 shows electrochemical performance of HPVB flow cells using 0.5 M HPOM (40 mL min$^{-1}$). a-e, Electrochemical performance of HPVB flow cell at 25° C. a, Capacity and efficiencies for HPVB flow cells cycling at 100 to 500 mA cm$^{-2}$. b, Galvanostatic voltage profiles at 100 to 500 mA cm$^{-2}$. c, Discharge polarization curves. d, Cycling capacity and coulombic efficiency at 300 mA cm$^{-2}$. e, Galvanostatic voltage profile at 300 mA cm$^{-2}$. f-i, Electrochemical performance of HPVB flow cells at −20° C. f, Capacity and efficiencies for HPVB flow cell cycling at 100 to 240 mA cm$^{-2}$. g, Galvanostatic voltage profiles at 100 to 240 mA cm$^{-2}$. h, Discharge polarization curves. i, Cycling capacity and coulombic efficiency at 160 mA cm$^{-2}$. The inserts show galvanostatic voltage profile at 160 mA cm$^{-2}$ and FT-IR spectra of 0.5 M HPOM negolyte at −20° C.
Figure 15:
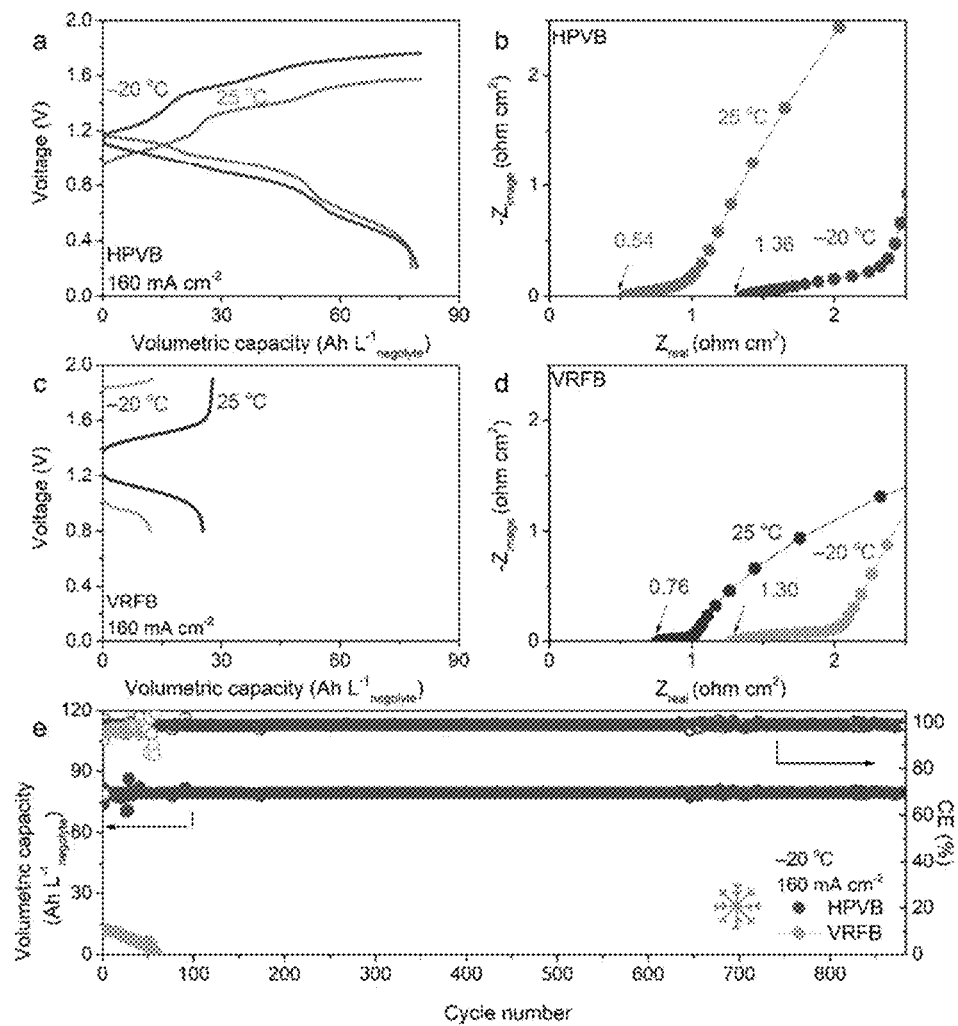

FIG. 15 shows electrochemical performance of HPVB using 0.5 M HPOM negolyte and VRFB using 1.5 $M^{3+}$ negolyte under flow mode (40 mL $min^{-1}$) at different temperatures. a, and c, Galvanostatic voltage profiles of HPVB flow cells and VRFB flow cells at different temperatures. b, and d, Electrochemical impedance spectroscopy (EIS) of the VRFB and HPVB at different temperatures. e, Comparison of cycling capacity and coulombic efficiency of HPVB and VRFB flow cells at 160 mA $cm^{-2}$ at $-20°$ C. The cycling data of HPVB is the same one from FIG. 14$i$.

Figure 16:
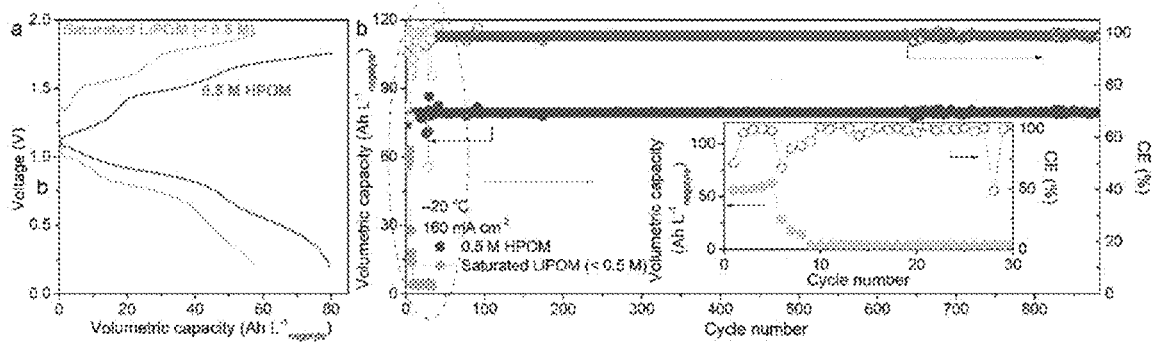

FIG. 16 shows electrochemical performance of HPVB using 0.5 M HPOM and LPVB using 0.5 M LiPOM negolyte under flow mode (40 mL $min^{-1}$) at $-20°$ C. a, Galvanostatic voltage profiles of HPVB flow cells and LPVB flow cells at $-20°$ C. b, Comparison of cycling capacity and coulombic efficiency of HPVB and LPVB flow cells at 160 mA $cm^{-2}$ at $-20°$ C. The cycling data of HPVB is the same one from FIG. 14$i$.

DETAILED DESCRIPTION

The disclosure will be further illustrated by the following specific embodiments. However, the specific embodiments are listed for illustrative purposes only, and not intended to limit the disclosure. As will be appreciated by those skilled in the art, specific feature(s) according to any one of the following embodiments may be used in any other embodiments without deviating from the spirit of the disclosure.

Figure 1:
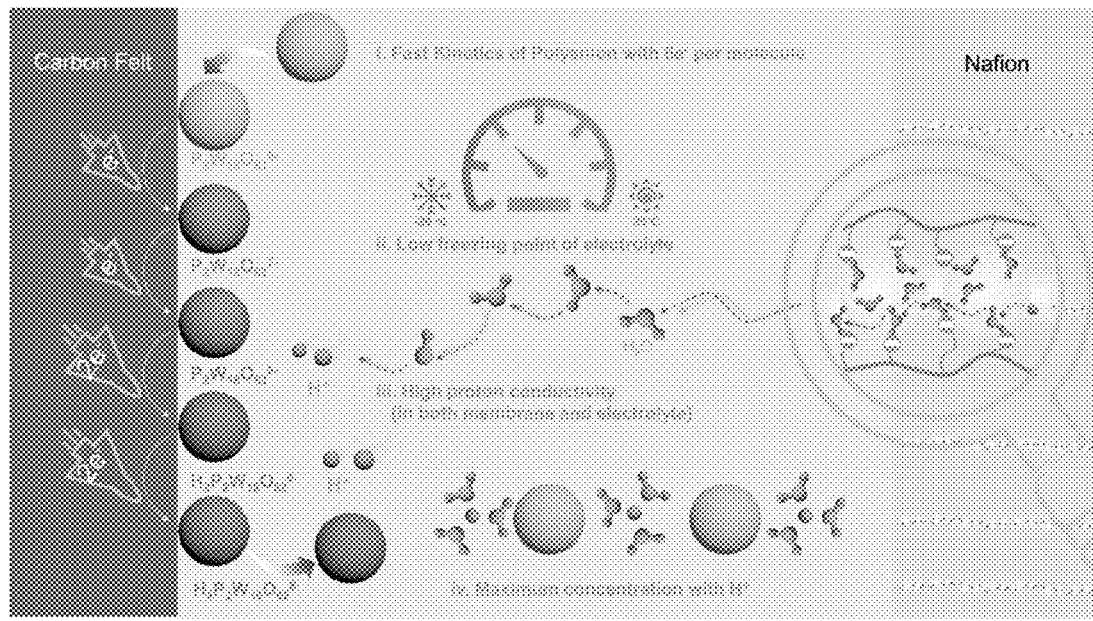
FIG. 1 shows a principle of heteropoly acid redox flow battery of the present disclosure for low-temperature applications. HPOM electrolyte exhibits i, multi-electron reactions with fast redox kinetics: ii, low freezing point down to −35° C. (0.5 M HPOM); iii, high ionic conductivity (74.32 mS cm$^{-1}$, 0.5 M HPOM at −20° C.); iv, high solubility of redox active materials (0.7 M at 25° C. and 0.5 M at −20° C., achieving 110.2 Ah L$^{-1}_{negolyte}$ and 79.6 Ah L$^{-1}_{negolyte}$, respectively).

Major electrolyte design requirements for low-temperature ARFBs include low-freezing point, high electron solubility (high volumetric capacity), and fast kinetics. In this regard, the multi-electron heteropoly acid negolyte $H_6P_2W_{18}O_{62}$ (HPOM) of the present disclosure exhibits exceptionally fast redox kinetics, low-freezing point, and high electron solubility, as shown in FIG. 1.

The inventors of the present disclosure surprisingly found that the delocalized electrons and the fully oxidized tungsten allow rapid six-electrons reactions without structural changes, which is supported by the fast electron transfer rate constant ($6.82 \times 10^{-3}$ cm $s^{-1}$) at 25° C. The proton ($H^+$) in $P_2W_{18}O_{26}^{6-}$ warrants the highest solubility of POMs at room temperature (25° C., 0.74 M) and low temperature ($-20°$ C., 0.5 M) compared to the other conventional electrolytes, for example, $P_2W_{18}O_{62}^{6-}$ with other cations ($Li^+$/$Na^+$/$K^+$), owing to the strong solvation shell of $H^+$ preventing precipitation. The HPOM exhibits the low freezing point ($-35°$ C.) and high conductivity (0.5 M HPOM, 196.43 mS $cm^{-1}$ (25° C.) and 74.32 mS $cm^{-1}$ ($-20°$ C.)) compared to other cations owing to its high solubility and Grotthuss proton conduction mechanism. These merits warrant HPOM the only ideal POM candidate for high-power-density and high-energy-density flow battery at low temperatures.

In addition, the other polyoxometalate with hydrogen counter-ions can be used in the low temperature ARFBs owing to the strong solvation shell of $H^+$ preventing precipitation. In some embodiments, the polyoxometalate with Kegging structure ($H_3PW_{12}O_{40}$, $H_4SiW_{12}O_{40}$, $H_3PMo_{12}O_{40}$, $H_4SiMo_{12}O_{40}$, and so on), Dawson structure ($H_6P_2W_{18}O_{62}$, $H_8Si_2W_{18}O_{62}$, $H_6P_2Mo_{18}O_{62}$, $H_8Si_2Mo_{18}O_{62}$, and so on), and any combination thereof.

At a normal temperature of 25° C., the HPOM-vanadium redox flow batteries (HPVBs, flow mode) demonstrate superior rate performance from 100 to 500 mA $cm^{-2}$ with a high energy efficiency (81.82%) at 100 mA $cm^{-2}$ and stable cycling (78.8 Ah $L^{-1}_{negolyte}$) over 450 cycles at 300 mA $cm^{-2}$. At a low temperature of $-20°$ C., the HPVB achieves a high capacity of 79.6 Ah $L^{-1}_{negolyte}$ at 160 mA $cm^{-2}$ over 800 cycles (above 1,200 h) without decay, demonstrating superior stability and power density (282.4 mW $cm^{-2}$) for low temperature flow battery applications. As mentioned in the above, operating ARFBs at low temperatures is prohibited by limited solubility, freezing electrolytes, and sluggish reaction kinetics. The HPOM electrolyte of the present disclosure can be used in the ARFBs (for example 0.5 M HPOM electrolyte) which demonstrate an excellent power density (282.4 mW $cm^{-2}$) and stability (79.6 Ah $L^{-1}_{negolyte}$ at 160 mA $cm^{-2}$ over 1,200 hours without decay) at $-20°$ C., showing promising application potential for extreme cold weather conditions.

Based on the above, the aqueous redox flow battery of the disclosure comprises a positive electrode, a negative electrode, a posolyte chamber containing a posolyte wherein at least a part of the positive electrode is immersed in a solution of the posolyte, a negolyte chamber containing a negolyte of polyoxometalate such as $H_6P_2W_{18}O_{62}$ wherein at least a part of the negative electrode is immersed in an aqueous solution of the negolyte, and a separator disposed between the posolyte chamber and the negolyte chamber.

In some embodiments, the concentration of the negolyte is 0.3 M to 0.74 M, for example, 0.4 M to 0.7 M or 0.5 M to 0.6 M, preferably 0.5 M to 0.55 M. In some embodiments, the negolyte chamber further comprises an acid supporting electrolyte, which may be selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 5 wt % to 15 wt %, for example, 8 wt % to 12 wt %, such as 10 wt %. In some embodiments, the negolyte further comprises $M_6P_2W_{18}O_{62}$, wherein $M^+$ is selected from the group consisting of $Li^+$, $Na^+$, $K^+$, and any combination thereof. In those instances, $H_6P_2W_{18}O_{62}$ is 50 wt % or more of total negolytes, for example, 60 wt % or more, 70 wt % or more, 80 wt % or more, 90 wt % or more, or 95 wt % or more.

In some embodiments, the negolyte further comprises $M_6P_2W_{18}O_{62}$, wherein $M^+$ is selected from the group consisting of $Li^+$, $Na^+$, $K^+$, and any combination thereof. In some embodiments, $H_6P_2W_{18}O_{62}$ is 50 wt % or more of total negolytes, for example, 60 wt % or more, 70 wt % or more, 80 wt % or more, 90 wt % or more, or 95 wt % or more.

In some embodiments, the posolyte is selected from the group consisting of $Fe^{2+}/Fe^{3+}$, $VO^{2+}/VO^{2+}$, $Mn^{2+}/Mn^{3+}$, $I^-/I_3^-$, $Br^-/Br_2$, $Ce^{4+}/Ce^{3+}$, and any combination thereof. In some embodiments, the concentration of the posolyte is 0.5 M to 1.8 M, for example, 0.8 M to 1.6 M, or 1 M to 1.5 M. In some embodiments, the posolyte chamber further comprises an acid supporting electrolyte, which may be selected from the group consisting of hydrochloric acid, hydrobromic acid, hydroiodic acid, sulfuric acid, nitric acid, phosphoric acid, carboxylic acid, sulfonic acid, perchloric acid, and any combination thereof. In some embodiments, the concentration of the supporting electrolyte is 2 M to 5 M, for example, 3 M to 4 M.

In some embodiments, the posolyte chamber is in fluid-communication with a posolyte tank, and the negolyte chamber is in fluid-communication with a negolyte tank. In some embodiments, the separator is ion permeable membrane, for example Polyolefin based membrane, fluoropolymer based membrane, polybenzimidazole (PBI) based membrane, polyamide (PA) based membrane, polysulfone (PSU) based membrane, polymers of intrinsic microporosity (PIMs) membrane, metal organic framework (MOF) membrane, covalent organic frameworks (COF) membrane, and any combination thereof. In some embodiments, the positive electrode comprises a material selected from the group consisting of metal, carbon felt, carbon paper, graphene sheet, conducting polymer, and any combination thereof. In some embodiments, the negative electrode comprises a material selected from the group consisting of carbon felt, carbon paper, graphene sheet, and any combination thereof.

In some embodiments, the aqueous redox flow battery has the lowest operation temperature of −35° C., for example, the lowest operation temperature of −30° C. or the lowest operation temperature of −25° C.

EXAMPLES

The following examples facilitate better understanding of the disclosure, and are not intended to limit the disclosure in any way. Unless otherwise specifically indicated, the test methods used in the following examples are conventional methods. Unless otherwise specifically indicated, the materials, reagents, etc. used in the following examples are commercially available reagents and materials. The plasmids are obtained through standard molecular cloning method.

All chemicals were used as received. In particular, diethyl ether (≥99%), sulfuric acid ($H_2SO_4$, 95-98%), hydrochloric acid (HCl, 36.5-38.0%), phosphoric acid ($H_3PO_4$, 85%), lithium carbonate ($Li_2CO_3$, ≥99%), sodium carbonate ($Na_2CO_3$, ≥99%), and potassium carbonate ($K_2CO_3$, ≥99%) were received from Sigma-Aldrich. Sodium tungstate dihydrate ($Na_2WO_4$, ≥99%), ammonium chloride ($NH_4Cl$, AR, analytical reagent), hydrogen peroxide ($H_2O_2$, 30 wt % in $H_2O$) were received from Dieckman. Vanadyl sulfate ($VOSO_4 \cdot 3.5H_2O$, ≥98%) was received from Shanghai Huating Chemical Factory. Carbon plates were received from Yi Deshang Carbon Technology Co., Ltd. Carbon felts (GFD 4.6EA) were received from SGL Carbon GmbH. Nafion® membrane (N117, Dupont) was received from Shanghai Hesen Electric.

Example 1

To understand the role of cation in the physical properties of polyoxometalate ($P_2W_{18}O_{26}^{6-}$), $M_6P_2W_{18}O_{62}$ ($M^+=H^+$, $Li^+$, $Na^+$ and $K^+$, denoted as MPOM) were synthesized. HPOM was synthesized by the $[W_7O_{24}]^{6-}$ building block synthon-based approach according to the Nadjo's method (Mbomekalle, I.-M., Lu, Y. W., Keita, B. & Nadjo, L. Simple, high yield and reagent-saving synthesis of pure α-$K_6P_2W_{18}O_{62} \cdot 14H_2O$. *Inorg. Chem. Commun.* 7, 86-90 (2004), entire contents of which are incorporated herein by references).

Specifically, $Na_2WO_4 \cdot 2H_2O$ (30 g) was dissolved in 35 mL DI water, acidified by 4 M HCl (25 mL) under vigorous stirring. After the cloudy solution turned limpid again, 4 M $H_3PO_4$ (25 mL) was added slowly with vigorous stirring, followed by 24 h refluxing. Then, $NH_4Cl$ (27 g) was added after cooling down the solution to room temperature, yielding a precipitate. The resulting precipitated products were collected and treated by filtration, re-dissolved in DI water, and re-precipitated with $NH_4Cl$. The precipitation was dissolved again by DI water under 50° C. After adding 20 mL HCl and 20 mL diethyl ether followed by shaking, the lowest layer of the mixed solution (the ethereal solution) was transferred to another separatory funnel, followed by adding 25 mL DI water, 15 mL HCl and 10 mL diethyl ether. After shaking, the lowest layer was transferred to a beaker and evaporate through the rotating evaporator.

Figure 2:
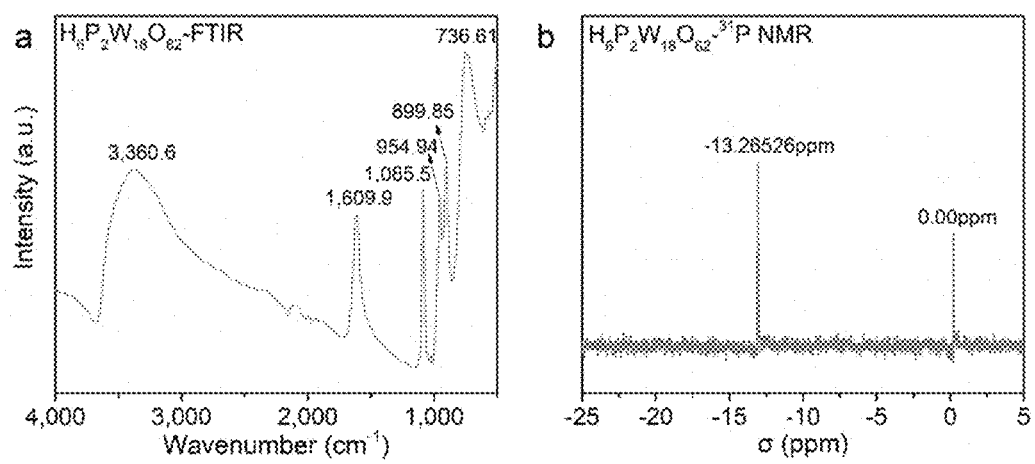
FIG. 2 shows materials characterizations of HPOM. a, FTIR spectroscopy and b, $^{31}$P NMR spectroscopy of HPOM.

The isomeric purity was confirmed by $^{31}$P-NMR (acquired on a Bruker AVANCE III HD 500 NMR spectrometer using $H_3PO_4$ as the field frequency lock), which showed a single peak at −13.26 ppm, which is consistent with the recorded data. FTIR spectroscopy was performed using a Bruker ALPHA FTIR spectrometer. Strong absorption bonds were observed for the stretching mode for W—O—W (736.6 $cm^{-1}$ and 900 $cm^{-1}$), W=O (954 $cm^{-1}$) and P—O (1,085 $cm^{-1}$). These bonds are consistent with reported $P_2W_{18}O_{26}^{6-}$ (FIG. 2). Moreover, $M_6P_2W_{18}O_{62}$ ($M^+=Li^+$, $Na^+$ and $K^+$) was prepared through ions exchange method by using $Li_2CO_3$, $Na_2CO_3$, and $K_2CO_3$.

Example 2

The $M_6P_2W_{18}O_{62}$ ($M^+=H^+$, $Li^+$, $Na^+$ and $K^+$) prepared in Example 1 were tested for their solubility, freezing point, and conductivity.

Figure 3:
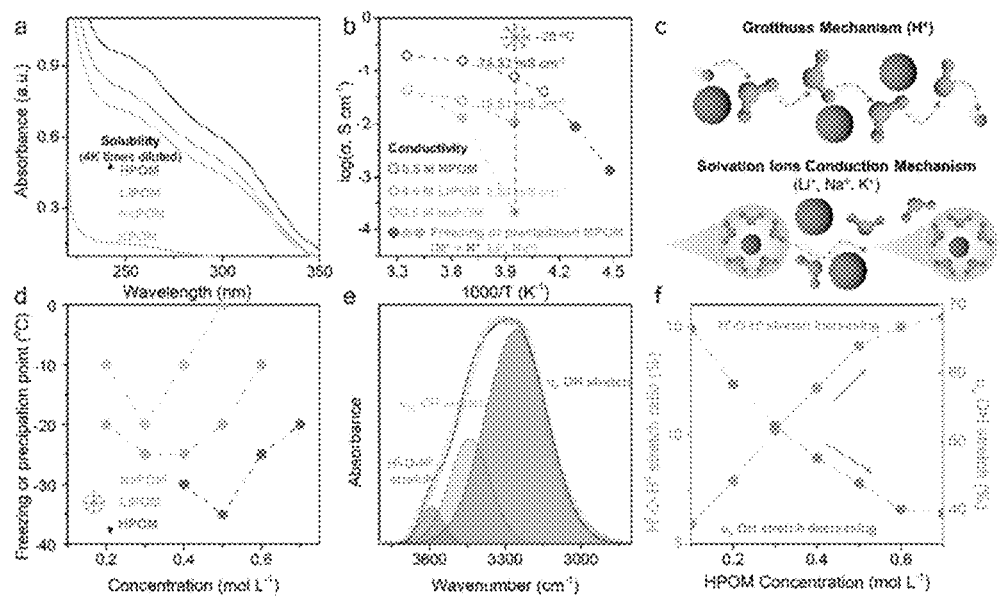
FIG. 3 shows physicochemical properties of the MPOM electrolyte at varying temperatures. a, UV-visible spectra of $P_2W_{18}O_{26}^{6-}$ with different cation. The analysis shows that the saturated concentration of $P_2W_{18}O_{62}^{6-}$ with H$^+$, Li$^+$, Na$^+$ and K$^+$ is 0.74, 0.62, 0.51, 0.11 M. b, The ionic conductivities of various $P_2W_{18}O_{62}^{6-}$ electrolytes with different cation in the temperature range of −50 to 25° C. c, Schematics of the Grotthuss mechanism of proton and solvated ions conduction mechanism. d, The freezing or precipitation point of the $P_2W_{18}O_{62}^{6-}$ electrolytes as a function of the $P_2W_{18}O_{62}^{6-}$ concentration with different cations. e, The fitted OH stretching vibration representing water molecules with $v_s$, $v_{as}$ and H$^f$—O—H$^b$ in FT-IR spectra. $v_s$ and $v_{as}$ are assigned to fully hydrogen-bonded water molecules ($v_s$ is the OH stretch for tetrahedrally coordinated water (~3,250 cm$^{-1}$), $v_{as}$ is the OH stretch for not fully coordinated water (~3,400 cm$^{-1}$). H$^f$—O—H$^b$ is assigned to not fully hydrogen-bonded water where the OH$^b$ oscillator is hydrogen-bonded to another molecule and the OH$^f$ oscillator is free (or weakly hydrogen-bonded) (~3,600 cm$^{-1}$). f, The proportion of $v_s$ stretch and H$^f$—O—H$^b$ stretch.

UV-visible spectra result shows that the solubility of $P_2W_{18}O_{26}^{6-}$ decreases from $H^+$ (0.74 M), $Li^+$ (0.62 M), $Na^+$ (0.51 M) to $K^+$ (0.11 M) at 25° C. (FIG. 3a). The decreasing radius of cations forms stronger solvation shell, which prevents aggregation between cations and the super chaotropic anion of $P_2W_{18}O_{62}^{6-}$ (solvent-separated from their anions), thereby increasing the solubility of the polyanion. Therefore, $P_2W_{18}O_{26}^{6-}$ with $H^+$ has the highest solubility among these POMs.

Figure 4:
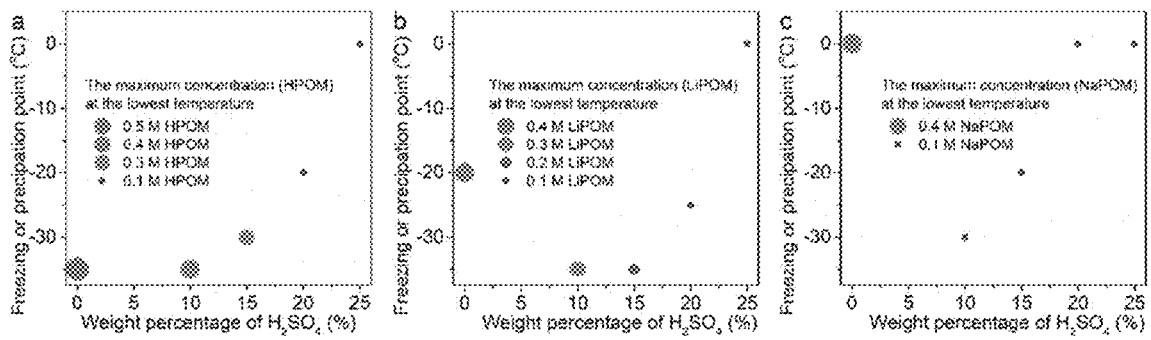
FIG. 4 shows the maximum solubility of MPOM (H$^+$, Li$^+$, Na$^+$) with different weight percentage of H$_2$SO$_4$ at the lowest temperature. a, HPOM. b, LiPOM. c, NaPOM.

The freezing points of MPOMs were studied by examining the physical state of various concentrations of MPOM (0 to 0.7 M) between −35° C. to 25° C. The lowest freezing point (−35° C.) was achieved with 0.5 M HPOM, which cannot be achieved by other cations (FIG. 3d). Increasing the concentration of MPOM would decrease solution freezing point. After reaching the lowest freezing point, further increasing the concentration of MPOM results in precipitations, which can be attributed to the strong ion-ion association between cations and $P_2W_{18}O_{62}^{6-}$. Although acid supporting salt ($H_2SO_4$) could lower the freezing point of LiPOM and NaPOM electrolytes and facilitate their proton-coupled electrochemical reactions, the solubility of LiPOM and NaPOM are much reduced in the presence of acid supporting electrolyte (FIG. 4).

Figure 5:
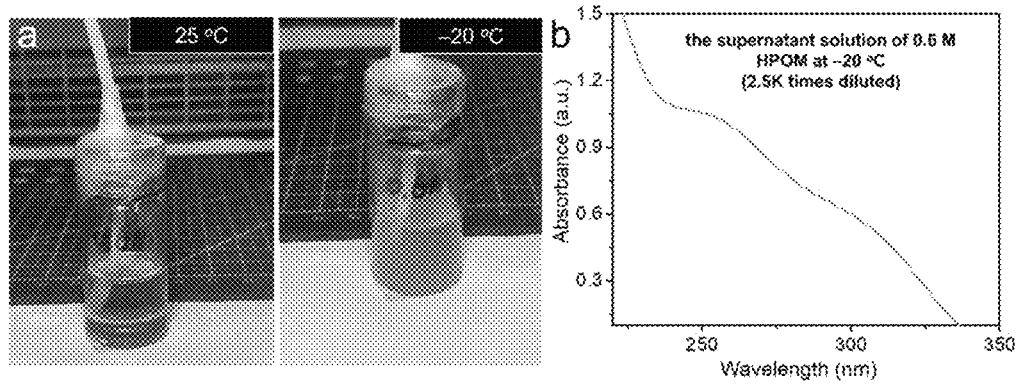
FIG. 5 shows the supernatant concentration of 0.6 M HPOM at −20° C. a, The digital photos of 0.6 M HPOM under 25° C. and −20° C. b, the absorbance of HPOM solution made by diluting 2.5K times of the supernatant solution (0.52 M) of 0.6 M HPOM at −20° C.

While similar situation also holds for HPOM, it's worth noting that the existing proton conductivity of HPOM itself without supporting electrolyte is sufficient for high-power ARFB applications at both room temperature and low temperature. To identify the optimum concentration of HPOM for low-temperature ARFB applications, the supernatant concentration of supersaturated HPOM (0.6 M) at −20° C. is determined to be 0.52 M (FIG. 5).

Considering that regulating the quantity of hydrogen bonds (H-bonds) and reducing the highly H-bound water molecules are regarded as effective kinetic pathways to suppress the freezing of water, the influence of HPOM concentration on water molecule bonding was determined by Fourier-transform infrared spectroscopy (FT-IR). The broaden peak of OH stretching of water can be decoupled into three sub-peaks (denoting is OH stretch, $v_{as}$ OH stretch and $H^f$—O—$H^b$ stretch in FIG. 3e): first two stretches are assigned to fully hydrogen-bonded water molecules ($v_s$ is the OH stretch for tetrahedrally coordinated water (~3,250 $cm^{-1}$), $v_{as}$ is the OH stretch for not fully coordinated water (~3,400 $cm^{-1}$)). $H^f$—O—$H^b$ stretch is assigned to not fully hydrogen-bonded water denoting $H^f$—O—$H^b$ where the $OH^b$ oscillator is hydrogen-bonded to another molecule and the OH oscillator is free (or weakly hydrogen-bonded) (~3,600 cm$^{-1}$). With increasing concentration of HPOM, intensities at $v_s$ OH stretch decreased while that at $H^f$—O—$H^b$ stretch increased, indicating that the addition of HPOM weakened the hydrogen bonding network of water molecules (FIG. 3f) due to the strong interaction between the abundant oxygen on HPOM surface and the water molecules.

In addition, $P_2W_{18}O_{26}^{6-}$ with $H^+$ shows higher ionic conductivity than $Li^+$ and $Na^+$— POMs at all testing temperatures (-50 to 25° C.) revealed by electrochemical impedance spectroscopy (EIS). The conductivity of the electrolytes was measured via the a.c. impedance method using a VMP3 electrochemical testing station (Bio-logic) or an Arbin Instrument (Model MSTAT21044, Arbin Instruments). A cell with a pair of stainless-steel foil electrodes was used, and the cell constant was defined with respect to a standard KCl aqueous solution.

The 0.5 M HPOM shows higher ionic conductivity (196.43 mS cm$^{-1}$) than 0.5 M LiPOM (43.17 mS cm$^{-1}$) and 0.5 M NaPOM (45.45 mS cm$^{-1}$) at 25° C. owing to the Grotthuss proton conduction. The motion is similar to a Newton's cradle, using the local proton replacement leading to the long-range transportation. In contrast, the long-distance individual diffusions of solvated metal ions are largely affected by the temperature (FIG. 3c). At low temperatures, 0.5 M HPOM maintains a high ionic conductivity of 74.32 mS cm$^{-1}$ at -20° C. without supporting electrolyte, which becomes promising for high power operations at low temperatures. In contrast, the saturated LiPOM and NaPOM (<0.5 M) only show 10.51 and 0.21 mS cm$^{-1}$ at -20° C. (FIG. 3b). These merits in physical properties warrant HPOM as the only ideal candidate among MPOMs for high-power density and high-energy density flow battery applications at low temperatures.

Example 3

The electrochemical reaction mechanisms of the heteropoly acid HPOM at 25° C. was tested using cyclic voltammetry and rotating ring disk electrode (RRDE) techniques. The rotating-ring disk electrode configuration used in the disclosure was adopted from that reported by Herranz et al (Herranz, J., Garsuch, A. & Gasteiger, H. A. Using Rotating Ring Disc Electrode Voltammetry to Quantify the Superoxide Radical Stability of Aprotic Li-Air Battery Electrolytes. *J. Phys. Chem. C* 116, 19084-19094 (2012), the entire contents of which are incorporated herein by references).

Specifically, the working electrode consisted of a PTFE embedded GC disk (Ø 4 mm) surrounded by a GC ring (Ø 5 mm of internal and Ø 7 mm of external, ALS). The GC ring disk electrode was polished with a 0.05 μm alumina suspension (ALS), cleaned by sonication in DI water and dried in air. A platinum wire (Ø 0.5 mm, ALS) and a SCE (CH Instruments) were used as counter electrode and reference electrode. The electrochemical measurements were conducted using 700D Series Electrochemical Analyser/Workstation (CH Instruments).

In addition, the cyclic voltammograms (CV) measurements were performed using a three-electrode cell configuration. The HPOM electrolyte was tested at 10 mM in 1 M $H_2SO_4$ with glass carbon (GC, Ø 3.0 mm, CH Instruments) as working electrode under ambient atmosphere. For the $V^{2+}/V^{3+}$ electrolyte, due to its sluggish kinetics and oxygen sensitivity, the CV was tested at 0.3 M in 3 M $H_2SO_4$ with a carbon felt as working electrode (more surface area than GC) under argon atmosphere (avoid oxygen). A platinum wire (Ø 0.5 mm, ALS) was used as the counter electrode and a Saturated Calomel Electrode (SCE, pre-soaked in 3 M KCl solution, CH Instruments) was used as the reference electrode. CV data were collected using a VMP3 electrochemical testing unit (BioLogic) at a scan rate from 10 mV s$^{-1}$-1,000 mV s$^{-1}$ for HPOM.

Figure 6:
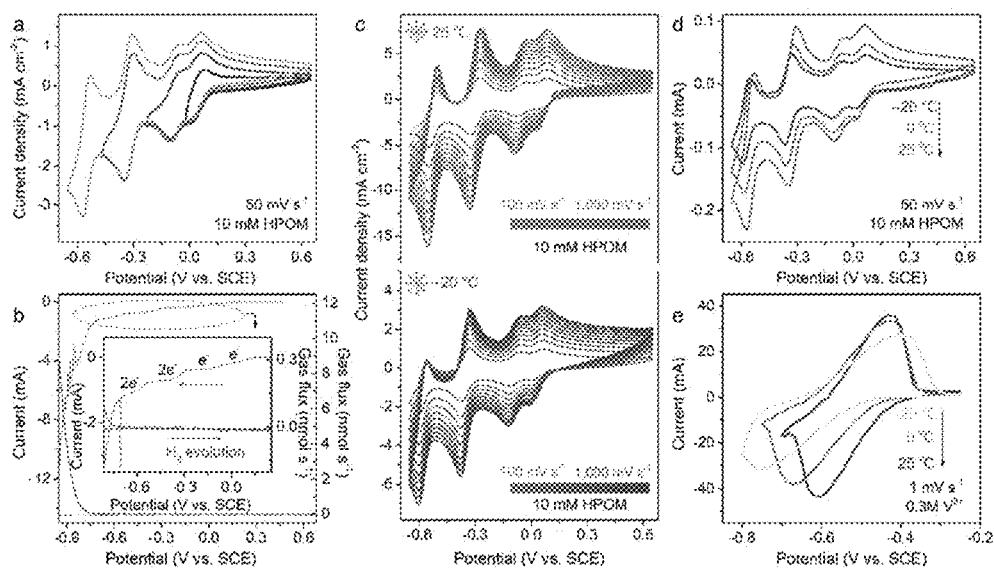
FIG. 6 shows electrochemical properties of HPOM. a, CV curves of 10 mM HPOM at 50 mV s$^{-1}$. b, OEMS measurement of 10 mM HPOM during LSV test with 0.5 mV s$^{-1}$. c, CV curves of 10 mM HPOM from 10 to 1,000 mV s$^{-1}$ at 25° C. and −20° C. The scan rate is shown in the color. d, and e, CV curves of 10 mM H$_6$P$_2$W$_{18}$O$_{62}$ and 0.3 M V$^{2+}$/V$^{3+}$ at different temperatures.
Figure 7:
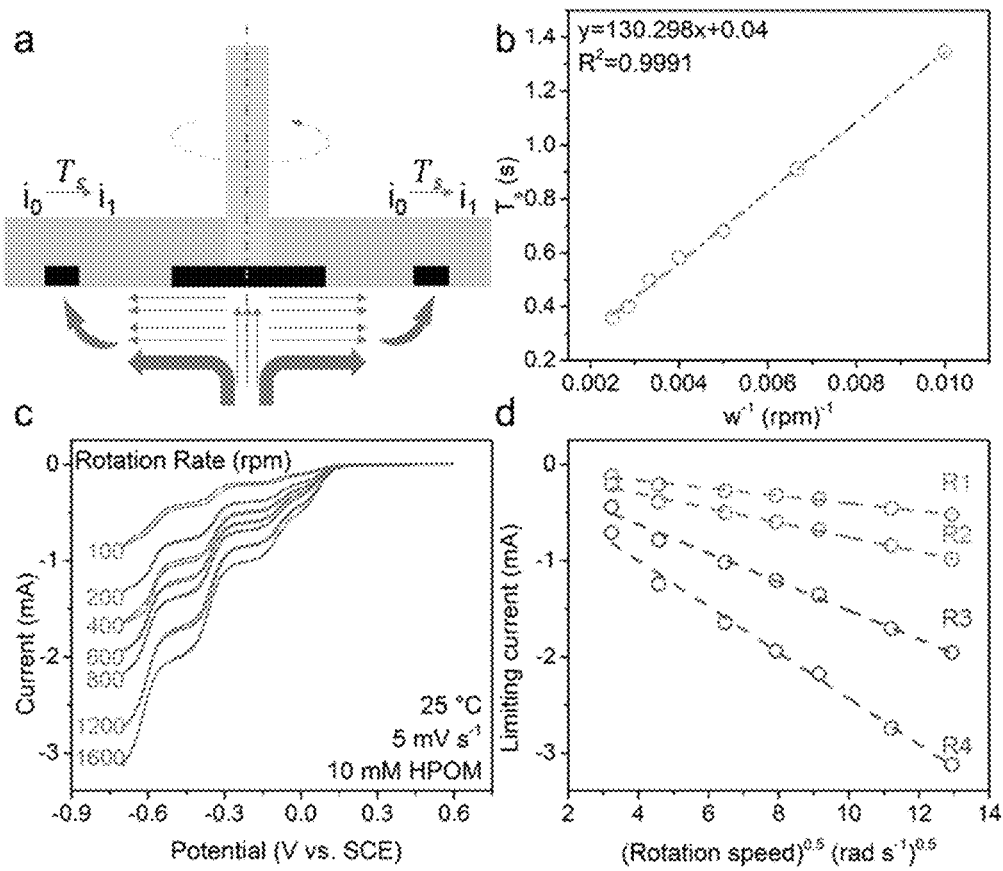
FIG. 7 shows detennination of numbers of electron transferred. a, Schematic illustration of the time delay test in RRDE. b, Relationship between the transient time (T$_s$) and the rotation speed (ω). c, Rotating-disk-electrode (RDE) characterization of 10 mM HPOM. Disk current versus potential (referenced to SCE) at rotation rate ranging from 100 to 1,600 rpm at 5 mV s$^{-1}$. d, Levich-Koutecky plots.

FIG. 6a shows the cyclic voltammograms (CVs) of HPOM, demonstrating four highly reversible redox pairs (0.023/0.077, -0.098/-0.049, -0.347/-0.303, -0.572/-0.532 V versus Saturated Calomel Electrode (SCE)), respectively. The number of electrons transferred for each step (0.98, 0.91, 1.83, and 2.23 for R1, R2, R3, and R4, respectively. R1 to R4 indicates the first to fourth reduction reaction) was verified by the Levich-Koutecky analysis obtained via RRDE (FIG. 7). However, further reducing the potential to lower than -0.7 V vs. SCE should be avoided since it could induce irreversible redox reactions and parasitic hydrogen evolution reaction (HER). The online electrochemical mass spectroscopy (OEMS) was used to monitor gas evolution during linear sweep voltammetry (LSV).

Specifically, the OEMS measurement was performed on a QMS 200 atmospheric sampling system (Stanford Research Systems) that was connected to the conventional electrolytic tank. Two SS316 tubes with ball valves were welded on the top of the conventional electrolytic tank to allow continuous sampling of the evolved gas in the cell head space by the Ar carrier gas (N5.0, Linde HKO) and subsequent analysis in a mass spectrometer (QMS 200, Stanford Research Systems). The quantification of gas was calibrated by a standard gas mixture of $O_2$, $CO_2$, CO, $H_2$ and $H_2O$ (5,000 ppm each, balanced by Ar; Linde HKO) to convert the mass spectrometer signals into concentrations. To collect the real-time signal of evolved gas, the rotating stir bar placed under the working electrode to avoid gas aggregation.

No visible $H_2$ signal was detected until the potential reaching -0.7 V vs. SCE, indicating that water decomposition was negligible for the first six electrons reaction (FIG. 6b). Further lowering the potential below -0.7 V vs. SCE involves large amount of HER, which should be avoided in ARFBs. The six electrons reaction scheme of HPOM can be expressed as (Sadakane, M. & Steckhan, E. Electrochemical Properties of Polyoxometalates as Electrocatalysts. *Chem. Rev.* 98, 219-238 (1998).):

(1)

(2)

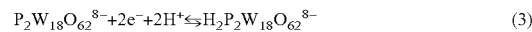
(3)

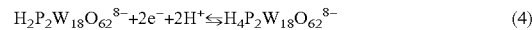
(4)

Figure 8:
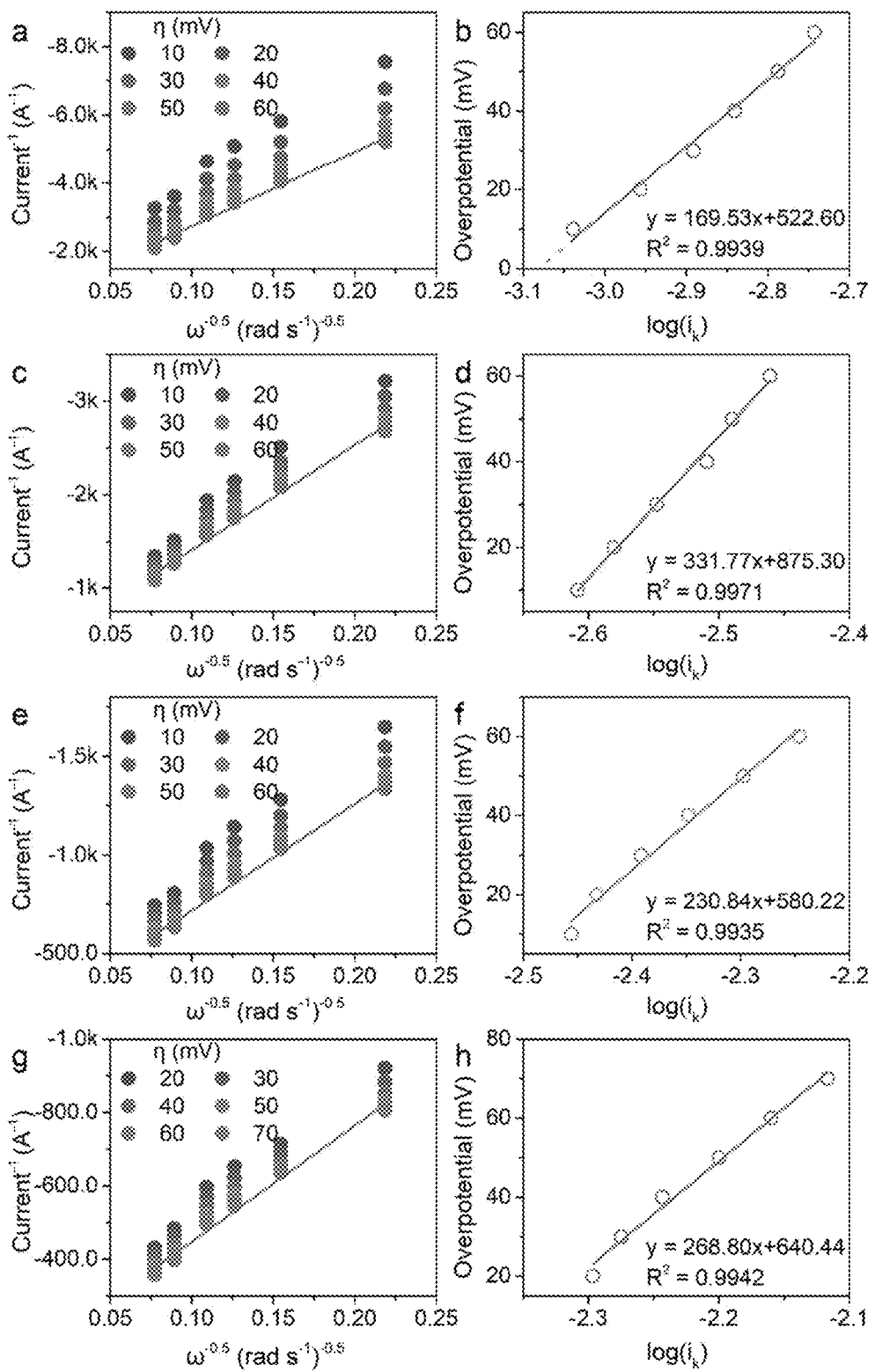
FIG. 8 shows reaction kinetics of HPOM. a, c, e, and g, Koutecky-Levich plot for R1, R2, R3, R4, respectively. b, d, f, and h, Tafel plot for R1, R2, R3, R4, respectively.

The reaction kinetics of HPOM was evaluated by cyclic voltammetry under various scan rates at 25° C. FIG. 6c shows CVs of HPOM from 100 to 1,000 mV s$^{-1}$ at 25° C., whose peak current densities increased linearly with the square root of the scan rate, with coefficient of determination ($R^2$) close to 1, confirming the diffusion limitation process of HPOM. RRDE measurements (5 mV s$^{-1}$) were performed and Butler-Volmer equation was used to determine the kinetics rate constant of the HPOM redox reaction to be k=6.82×10$^{-3}$ cm s$^{-1}$ (FIG. 8), which is significantly faster than that of $V^{3+}/V^{2+}$ (3.9×10$^{-5}$ cm s$^{-1}$) (Sum, E. & Skyllas-Kazacos, M. A study of the V(II)/V(III) redox couple for redox flow cell applications. *J. Power Sources* 15, 179-190

(1985).), and methyl viologen (MV, $2.8\times10^{-4}$ cm s$^{-1}$) (Liu, T., Wei, X., Nie, Z., Sprenkle, V. & Wang, W. A Total Organic Aqueous Redox Flow Battery Employing a Low Cost and Sustainable Methyl Viologen Anolyte and 4-HO-TEMPO Catholyte. *Adv. Energy Mater* 6, 1501449 (2016)). The fast redox kinetic of HPOM can be attributed to its delocalized electrons and fast proton-coupling resulting from protons in the structure.

Figure 9:
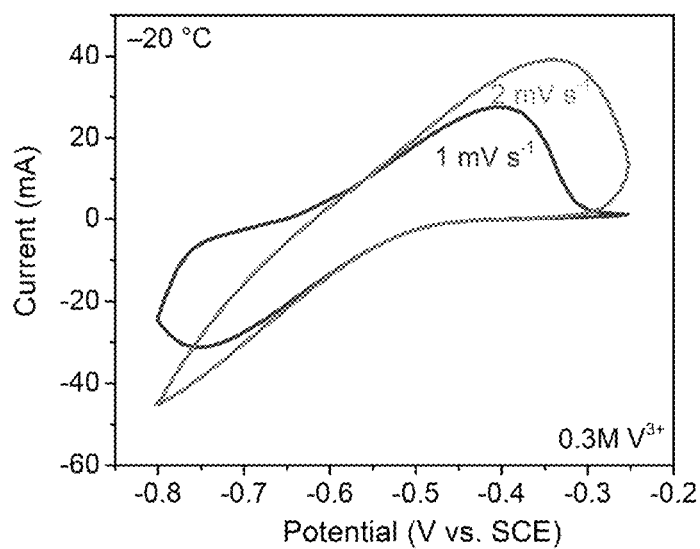
FIG. 9 shows CV curves of V$^{2+}$/V$^{3+}$ at various scan rates in −20° C.

The electrochemical properties of HPOM at low temperatures were also tested in comparison with the well-established ARFBs negolyte $V^{2+}/V^{3+}$. FIG. 6d shows the CVs of HPOM between 25° C. to −20° C., confirming high reversibility of the HPOM redox reactions at −20° C. No obvious change of the overpotential confirms the similar kinetics of HPOM from 25° C. to −20° C., which is supported by the linearly relationship between the peak current density and the square root of the scan rate from 100 to 1,000 mV s$^{-1}$ (FIG. 6c). In contrast, the commonly used negolyte $V^{2+}/V^{3+}$ showed significantly reduced reaction kinetics at low temperatures, which is supported by the substantially higher peak separation with decreasing temperatures (FIG. 6e), and the more sluggish CVs responses at increasing scan rates (FIG. 9). These observations support that the HPOM redox exhibits exceptionally high redox reversibility and reaction kinetics even at −20° C., which is difficult to achieve even using the most well-established ARFBs negolyte ($V^{2+}/V^{3+}$).

Example 4

Figure 10:
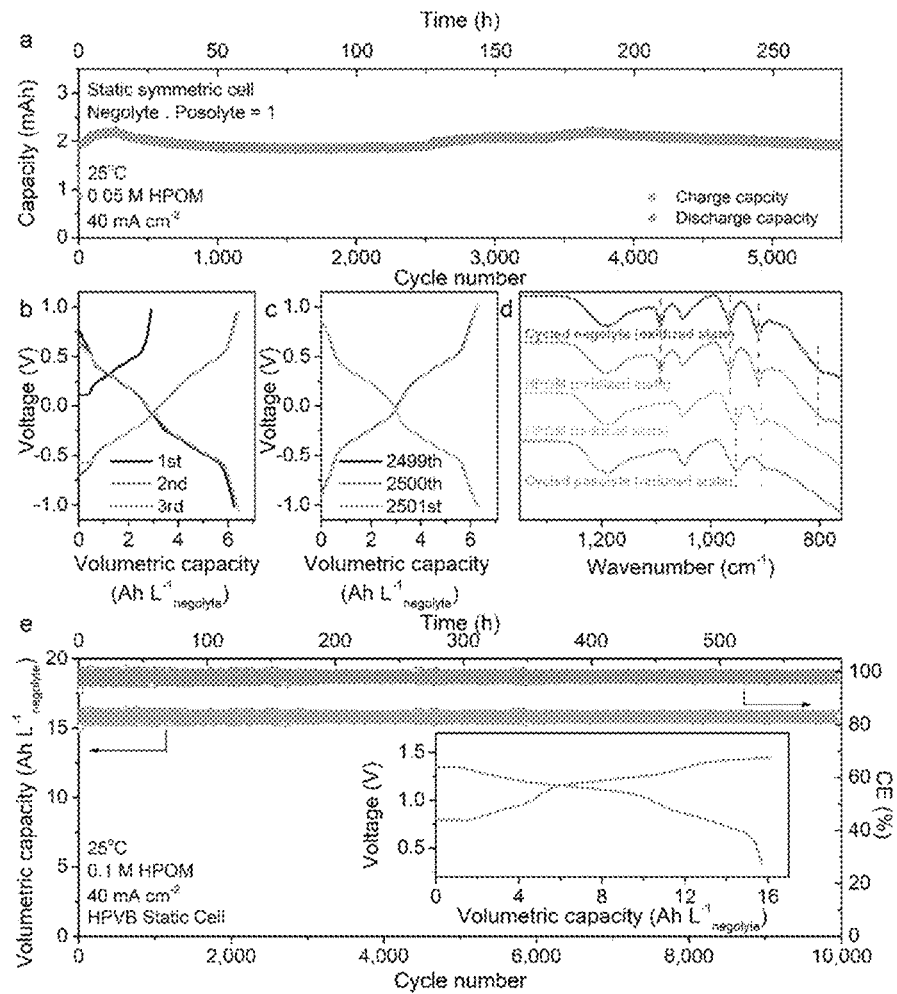
FIG. 10 shows electrochemical stability of HPOM negolyte at 25° C. a, Capacity retention of volumetric balanced synmnetric static cell as a function of cycle number and time when cycling of 0.05 M HPOM at 40 mA cm$^{-2}$. b and c, Galvanostatic voltage profiles of symmetric static cell at first and 2500 cycles. d, FT-IR spectra of 0.05 M HPOM solution at 25° C. measured at HPOM (oxidized state), HPOM (reduced state), posolyte after 5500 cycles (reduced state), and negolyte after 5500 cycles (oxidized state) in symmetric static cell. e, Cycling performance of the HPVB static cell using 0.1 M HPOM as negolyte and 1.5 M VOSO$_4$ as posolyte at 40 mA cm$^{-2}$. The insert shows galvanostatic voltage profile.

To investigate the electrochemical and chemical stability of HPOM, symmetric cell cycling test of HPOM and FT-IR measurements were conducted. The stability of HPOM was examined via galvanostatic cycling in a volumetrically balanced symmetric static cell (1:1). The equal volume symmetric cell was used instead of excess/limited to avoid the possibility of excess HPOM crossing to the limited side and to capture capacity loss from both sides. The HPOM equal volume symmetric cycling result shows a stable cycling performance (5500 cycles, over 10 days) without obvious capacity decay (FIG. 10a-c). No noticeable changes can be found from FT-IR measurements for the pristine HPOM (oxidized state) and fully reduced HPOM electrolyte before and after 15 days, supporting its high chemical stability. Further FT-IR measurements (FIG. 10d) show no structural changes of the cycled negolyte (oxidized state) and cycled posolyte (reduced state) from the HPOM symmetric cell compared to the pristine HPOM (oxidized state) and the fully reduced HPOM, confirming the excellent structural stability of HPOM during electrochemical process.

Then the stability of the HPOM-vanadium redox flow batteries (HPVBs) was examined at static mode using 0.1 M HPOM as the negolyte, which showed zero capacity decay at 15.8 Ah L$^{-1}_{negolyte}$ over 10,000 cycles at 40 mA cm$^{-2}$ (FIG. 10e).

Figure 11:
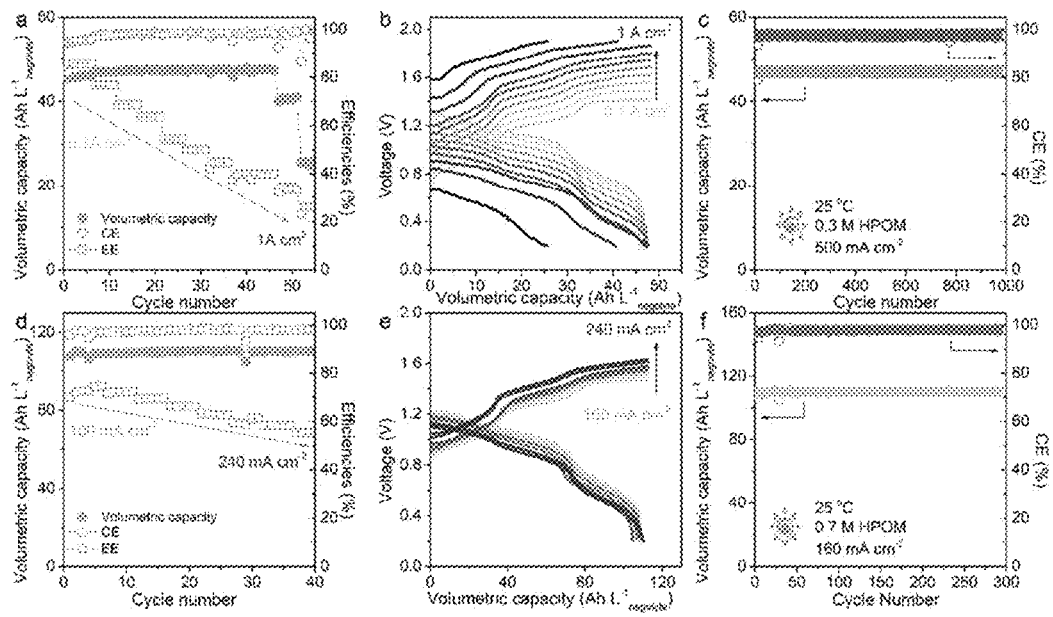
FIG. 11 shows electrochemical performance of HPVB flow cells (40 mL min$^{-1}$) at 25° C. a-c, Electrochemical performance of the HPVB flow cell using 0.3 M HPOM. a, Capacity and efficiencies at 0.1 to 1 A cm$^{-2}$. b, Galvanostatic voltage profiles at 0.1 to 1 A cm$^{-2}$. c, Cycling capacity and coulombic efficiency at 500 mA cm$^{-2}$. d-f, Electrochemical performance of the HPVB flow cell using 0.7 M HPOM. d, Capacity and efficiencies at 100 to 240 mA cm$^{-2}$. e, Galvanostatic voltage profiles at 100 to 240 mA cm$^{-2}$. f, Cycling capacity and Coulombic efficiency at 160 mA cm$^{-2}$.
Figure 12:
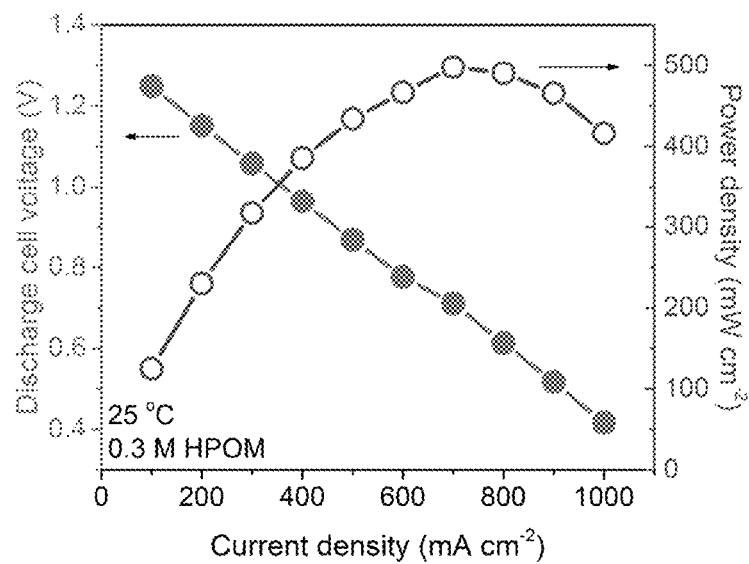
FIG. 12 shows discharge polarization curves of 0.3 M HPOM at 25° C.
Figure 13:
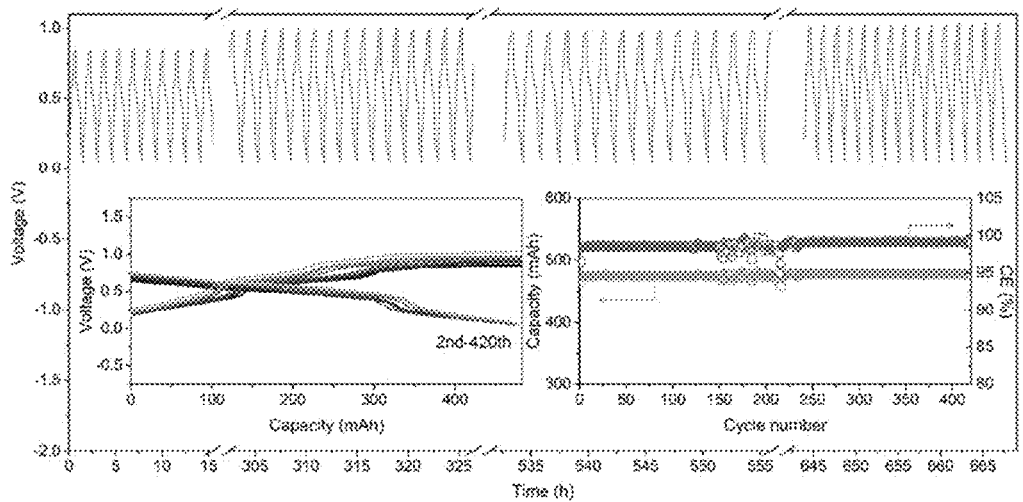
FIG. 13 shows electrochemical performance of HPOM—hydroiodic acid redox flow batteries (HPIBs) flow cells (40 mL min$^{-1}$) at 25° C. Electrochemical performance of PIBs using 0.5 M HPOM and 4 M HI at 160 mA cm$^{-2}$. The insets show the representative voltage profiles over cycling, coulombic efficiency (CE) and capacity retention during 420 cycles (over 665 h). The gradient from light blue to dark blue represents 2nd to 420th cycle of the voltage profile.

In addition, HPOM with different posolytes ($VO^{2+}/VO_2^+$ and hydroiodic acid) in flow mode also show high-rate performance and the excellent stability, demonstrating the high stability of HPOM in full cell. The HPVB with 0.3 M HPOM as the negolyte at flow mode demonstrated a high-rate performance from 100 mA cm$^{-2}$ to 1,000 mA cm$^{-2}$ (FIG. 11a-c). The energy efficiency (EE) was 85% at 100 mA cm$^{-2}$. The HPVB flow cells were stably cycled at 47.2 Ah L$^{-1}_{negolyte}$ for 1,000 cycles at a high current density of 500 mA cm$^{-2}$ without degradation. A high-power density of 497.7 mW cm$^{-2}$ at 700 mA cm$^{-1}$ can be achieved (FIG. 12). The HPVB with 0.7 M HPOM (equivalents to 4.2 M electrons) as the negolyte at flow mode demonstrated a reversible capacity of 110.2 Ah L$^{-1}_{negolyte}$ at a high current density (160 mA cm$^{-2}$) over 300 cycles (FIG. 11d-f). The high energy efficiency (EE) was 78% at 100 mA cm$^{-2}$. The HPOM-HI flow batteries (HPIBs) was examined at flow mode using 0.5 M HPOM as negolyte and 4 M HI as posolyte to eliminate the possibility of posolyte (e.g. vanadium) crossing over to contribute capacity. HPIBs showed a reversible capacity of 475.8 mAh (79.3 Ah L$^{-1}_{negolyte}$) at a high current density (160 mA cm$^{-2}$) over 420 cycles (over 665 h) (FIG. 13). The high stability of the HPIBs further supports the cycling stability of the HPOM in asymmetric full cells and highlight another possible posolyte to be coupled with HPOM. Please note all capacities reported in this example are based on the volume of negolyte.

Static cell measurement: The static cell with an active area of 2.0 cm$^2$ is composed of stacked layers of carbon plates and carbon felts on each side sandwiching N117. The N117 membranes were treated with 5% $H_2O_2$ under 80° C. for 1 h and then were transferred to 5% $H_2SO_4$ at 80° C. for 1 h. The membranes were rinsed in DI water for 30 min to wash away the chemicals after each step. Negolyte with 0.1 M HPOM (150 µL) were prepared by dissolving HPOM in 10 wt % $H_2SO_4$. Posolytes with 1.5 M $VO^{2+}$ were prepared by dissolving $VOSO_4$ in 3 M $H_2SO_4$ (250 µL). Both electrolytes were prepared at 25° C. The electrochemical impedance, charge and discharge tests of the HPVB static cell were conducted by using Arbin Instrument (Model MSTAT21044, Arbin Instruments) and LAND Battery Testing System (Land, Wuhan Land Electronic Co.) with constant current method (current density is based on the active area of the electrode). And the charge process was controlled by both voltage and capacity, while the cutoff voltage of discharge. All capacities reported are based on the volume of negolyte.

Galvanostatic symmetric static cell test: Galvanostatic symmetric static cell cycling was used to investigate the stability of HPOM. 0.05 M HPOM in 10 wt % $H_2SO_4$ was charged six electrons to prepare the fully charged HPOM, and then mixed charged negolyte with equal volume of the pristine 0.05 M HPOM negolyte, degassed with Ar for 60 mins, to afford the electrolyte consisting of 50% SOC 0.05 M HPOM. In the symmetric static cell, 300 µL of the resulting electrolyte was used as both negolyte and posolyte. A N117 membrane separated two reservoirs. Then, the cell was cycled by full galvanostatic reduction and oxidation at ±1 V at 40 mA cm$^{-2}$.

Flow cell measurement: The flow cell with an active area of 4.0 cm$^2$ is composed of stacked layers of carbon plates and carbon felts on each side sandwiching N117. N117 was treated the same way as the static mode. The electrolyte was circulated at the constant flow rate (40 mL min$^{-1}$) in each half-cell through PTFE tubing for the flow HPVB and VRFB cells. For HPVB, two kinds of negolytes were prepared: 1) 0.3 M (6 mL) and 0.7 M (6 mL) HPOM were prepared by dissolving HPOM in 10 wt % $H_2SO_4$. 2) 0.5 M (6 mL) HPOM were prepared by dissolving HPOM in DI water without supporting. The posolyte of HPVB were prepared by dissolving $VOSO_4$ (1.5 M) in 3 M $H_2SO_4$ (HPVB: 36 mL, and 84 mL for 0.3 M, and 0.7 M HPOM. The posolyte of HPIB was 30 mL 4 M HI for 0.5 M HPOM. All electrolytes were prepared at 25° C. The electrochemical impedance, charge and discharge tests of the HPVB flow cell were conducted by using Arbin Instrument (Model MSTAT21044, Arbin Instruments) and LAND Battery Testing System (Land, Wuhan Land Electronic Co.) with constant current method. And the charge process was controlled by both voltage and capacity, while the cutoff voltage of discharge. All capacities reported are based on the volume of negolyte.

Example 5

To demonstrate the application of HPOM as the negolyte in ARFBs at −20° C., $VO^{2+}/VO_2^+$ (1.5 M $VOSO_4$) was used as the posolyte which was reported to be stable (no precipitation) up to −40° C. to form HPVBs. To minimize the decay contribution from the $VO^{2+}/VO_2^+$ posolyte (e.g. crossover), excess amount of $VOSO_4$ was added to the posolyte tank to ensure that the cycling stability is largely limited by the HPOM negolyte of interest (common practice recommended in the literature) All four charge states of 0.5 M HPOM (R1 to R4) remain at liquid state at −20° C., which is important to guarantee no precipitations at changing oxidation states at low temperatures.

The cell performance of the HPVB cells were evaluated using 0.5 M HPOM at 25° C. (FIG. 14a-e). The posolyte used in all the HPVB cells was 1.5 M $VOSO_4$ in 3 M $H_2SO_4$. The HPVB flow cells demonstrated superior rate-performance and cycling stability at 25° C. As shown in FIGS. 14a and 14b, the HPVB flow cells demonstrated a high-rate performance from 100 mA $cm^{-2}$ to 500 mA $cm^{-2}$. The energy efficiency (EE) was 81.82% at 100 mA $cm^{-2}$. The HPVB flow cells were stably cycled at 78.8 Ah $L^{-1}_{negolyte}$ for over 400 cycles at a high current density of 300 mA $cm^{-2}$ without degradation (FIGS. 14d and 14e). In addition, a high-power density of 397.9 mW $cm^{-2}$ at 600 mA $cm^{-2}$ was achieved (FIG. 14c).

As shown in FIG. 14f-i, the rate performance, voltage profiles, power density, and cycling stability of the HPVB flow cells using 0.5 M HPOM negolyte at −20° C. were presented. The HPVB flow cells demonstrated superior rate performance from 100 to 240 mA $cm^{-2}$ and a high-power density of 282.4 mW $cm^{-2}$ at 400 mA $cm^{-2}$ at −20° C. The 0.5 M HPOM negolyte demonstrated excellent cycling stability at 474.9 mAh (79.6 Ah $L^{-1}_{negolyte}$) over 800 cycles (over 1,200 hours) at 160 mA $cm^{-2}$ with a high coulombic efficiency (CE) of 99.06% at −20° C.

The full cell performance is directly compared between the HPVBs and the VRFBs at both 25° C. and −20° C. (FIG. 15). The voltage profiles of HPVBs achieved the same capacity at 25° C. and −20° C. with minor increase in overpotential from 25° C. to −20° C. resulting from higher ionic resistance at lower temperature (FIGS. 15a and b). In contrast, the VRFBs showed dramatically lower capacity and higher polarization from 25° C. to −20° C., which cannot be solely attributed to the increase in ionic resistance (FIGS. 15 c and d). Consistently, the cycling stability of the HPVBs at −20° C. is significantly superior to that of the VRFBs. These results also show that the potential capacity contribution from vanadium crossover from posolyte to negolyte is insufficient to support the ultra-high cycling stability observed from the HPVBs at −20 C since the VRFBs also has the same amount of excess posolyte.

In addition, the flow battery performance of 0.5 M HPOM was compared with saturated LiPOM (<0.5 M) as negolyte at −20° C. (FIG. 16). The LiPOM negolyte shows a much higher polarization (low energy efficiency) and lower discharge volumetric capacity compared to HPOM, which is consistent with the lower ionic conductivity and lower solubility of LiPOM at low temperatures compared to HPOM. Critically, the saturated LiPOM can only be cycled for less than 10 cycles at −20° C. These observations further confirm the superior electrochemical performance of the HPVB flow batteries at low temperatures (−20° C.).

The structural stability of 0.5 M HPOM during cycling is also confirmed by ex-situ FT-IR spectroscopy, wherein P—O ($\sim 1,085$ $cm^{-1}$), W=O ($\sim 954$ $cm^{-1}$) and W—O—W ($\sim 900$ $cm^{-1}$) experience red-shift during charging and reversed back during discharge. The reversible change of the FT-IR spectra during repeated cycles is consistent with the high electrochemical stability of the HPVB flow cells at −20° C. The FT-IR spectrum of the pristine HPOM negolyte (FIG. 14i insert) was compared with that obtained after cycling at −20° C. including one discharge (D1), one charge (C1), 150 cycles of discharge (D150), 150 cycles of charge (C150), 200 cycles of discharge (D200), and 200 cycles of charge (C200). No obvious change of the FT-IR spectra can be identified, confirming the stable structural stability of the 0.5 M HPOM negolyte cycling at −20° C.

Flow cell measurement: The flow cell with an active area of 4.0 $cm^2$ is composed of stacked layers of carbon plates and carbon felts on each side sandwiching N117. N117 was treated the same way as the static mode. The electrolyte was circulated at the constant flow rate (40 mL $min^{-1}$) in each half-cell through PTFE tubing for the flow HPVB and VRFB cells. For HPVB, the negolytes was prepared by dissolving HPOM (0.5 M, 6 mL) in DI water without supporting. For VRFB, negolytes (1.5 M $V^{3+}$ in 3 M $H_2SO_4$, 12 mL) were prepared electrochemically in flow cells using $VOSO_4$. The posolyte of HPVB and VRFB were prepared by dissolving $VOSO_4$ (1.5 M, 60 mL) in 3 M $H_2SO_4$. All electrolytes were prepared at 25° C. For low-temperature measurements, the electrolyte was placed in −20° C. environment for 2 h before low temperature flow batteries tests. The electrochemical impedance, charge and discharge tests of the HPVB flow cell were conducted by using Arbin Instrument (Model MSTAT21044, Arbin Instruments) and LAND Battery Testing System (Land, Wuhan Land Electronic Co.) with constant current method. And the charge process was controlled by both voltage and capacity, while the cutoff voltage of discharge. All capacities reported are based on the volume of negolyte.

In view of the above examples, the multi-electron negolyte HPOM shows exceptionally high electron solubility, low freezing point, and high redox kinetics for high-power density low-temperature ARFB applications. The proton ($H^+$) in $P_2W_{18}O_{62}^{6-}$ warrants the highest solubility of HPOM at room temperature (25° C., 0.74 M) and low temperature (−20° C., 0.5 M) compared to other cations ($Li^+/Na^+/K^+$) owing to the strong solvation shell of $H^+$ preventing precipitation. The HPOM exhibits the lowest freezing point (−35° C.) and highest conductivity (0.5 M HPOM 196.43 mS $cm^{-1}$ (25° C.) and 74.32 mS $cm^{-1}$ (−20° C.)) compared to other cations owing to its high solubility and Grotthuss proton conduction mechanism, which warrant HPOM the only ideal POM candidate for high-power high-energy flow battery application at low temperatures.

The reaction mechanisms and kinetics of the HPOM were studied via cyclic voltammetry and rotating ring disk electrode, confirming fast redox kinetics and high reversibility at both 25° C. and −20° C. Coupling with a stable $VOSO_4$ posolyte, the resulting polyanionic-vanadium redox flow batteries (HPVBs) demonstrated high stability and superior rate performance at both 25° C. and −20° C. At 25° C., the HPVB flow cell stably cycled over 450 cycles with 78.8 Ah $L^{-1}_{negolyte}$ at high current density of 300 mA $cm^{-2}$ without capacity decay and achieved high power density (397.9 mW $cm^{-2}$ at 600 mA $cm^{-2}$). At −20° C., the HPVB flow cell demonstrated 79.6 Ah $L^{-1}_{negolyte}$ over 800 cycles (over 1,200 hours) at 160 mA $cm^{-2}$ and a record high-power density of 282.4 mW $cm^{-2}$ at 400 mA $cm^{-2}$. That is to say, the disclosure offers effective design for high-power and stable redox flow batteries for extreme cold weather conditions.

While a number of embodiments have been shown and described, it will be apparent to those skilled in the art that various changes and modifications may be made without departing from the invention in its broader aspects. The appended claims, therefore, are intended to cover all such changes and modifications as they fall within the true spirit and scope of the invention.

What is claimed is:

1. An aqueous redox flow battery, comprising a positive electrode, a negative electrode, a posolyte chamber containing a posolyte wherein at least a part of the positive electrode is immersed in a solution of the posolyte, a negolyte chamber containing a polyoxometalate with $H^+$ counter-ions as a negolyte wherein at least a part of the negative electrode is immersed in an aqueous solution of the negolyte, and a separator disposed between the posolyte chamber and the negolyte chamber, wherein the polyoxometalate is $H_6P_2W_{18}O_{62}$.

2. The aqueous redox flow battery of claim 1, wherein the polyoxometalate has a conductivity of 74 mS cm$^{-1}$ or more at −20° C.

3. The aqueous redox flow battery of claim 1, wherein a concentration of the negolyte is 0.3 M to 0.75 M.

4. The aqueous redox flow battery of claim 1, wherein the negolyte chamber further comprises an acid supporting electrolyte selected from the group consisting of hydrochloric acid, hydrobromic acid, hydroiodic acid, sulfuric acid, nitric acid, phosphoric acid, carboxylic acid, sulfonic acid, perchloric acid, and any combination thereof.

5. The aqueous redox flow battery of claim 1, wherein the negolyte further comprises other polyoxometalate than $H_6P_2W_{18}O_{62}$.

6. The aqueous redox flow battery of claim 1, wherein the posolyte is selected from the group consisting of $Fe^{2+}/Fe^{3+}$, $VO^{2+}/CO_2^+$, $Mn^{2+}/Mn^{3+}$, $I^-/I_3^-$, $Br^-/Br_2$, $Ce^{4+}/Ce^{3+}$, and any combination thereof.

7. The aqueous redox flow battery of claim 1, wherein the posolyte chamber further comprises an acid supporting electrolyte selected from the group consisting of hydrochloric acid, hydrobromic acid, hydroiodic acid, sulfuric acid, nitric acid, phosphoric acid, carboxylic acid, sulfonic acid, perchloric acid, and any combination thereof.

8. The aqueous redox flow battery of claim 1, wherein the separator is ion permeable membrane selected from polyolefin based membrane, fluoropolymer based membrane, polybenzimidazole based membrane, polyamide based membrane, polysulfone based membrane, polymers of intrinsic microporosity membrane, metal organic framework membrane, covalent organic frameworks membrane, and any combination thereof.

9. The aqueous redox flow battery of claim 1, wherein the positive electrode comprises a material selected from the group consisting of metal, carbon felt, carbon paper, graphene sheet, conducting polymer, and any combination thereof, and the negative electrode comprises a material selected from the group consisting of metal, carbon felt, carbon paper, graphene sheet, conducting polymer, and any combination thereof.

10. The aqueous redox flow battery of claim 1, which has a lowest operation temperature of −35° C.

11. An energy storage system comprising an aqueous redox flow battery, wherein the aqueous redox flow battery comprises a positive electrode, a negative electrode, a posolyte chamber containing a posolyte wherein at least a part of the positive electrode is immersed in a solution of the posolyte, a negolyte chamber containing a negolyte of $H_6P_2W_{18}O_{62}$ wherein at least a part of the negative electrode is immersed in an aqueous solution of the negolyte, and a separator disposed between the posolyte chamber and the negolyte chamber.

12. The energy storage system of claim 11, wherein a concentration of the negolyte is 0.3 M to 0.74 M.

13. The energy storage system of claim 11, wherein the concentration of the negolyte is 0.5 M to 0.7 M.

14. The energy storage system of claim 11, wherein the posolyte is selected from the group consisting of $Fe^{2+}/Fe^{3+}$, $VO^{2+}/VO_2^+$, $Mn^{2+}/Mn^{3+}$, $I^-/I_3^-$, $Br^-/Br_2$, $Ce^{4+}/Ce^{3+}$, and any combination thereof.

15. The energy storage system of claim 11, wherein the negolyte chamber further comprises an acid supporting electrolyte selected from the group consisting of hydrochloric acid, hydrobromic acid, hydroiodic acid, sulfuric acid, nitric acid, phosphoric acid, carboxylic acid, sulfonic acid, perchloric acid, and any combination thereof.

16. The energy storage system of claim 11, wherein the posolyte chamber further comprises an acid supporting electrolyte selected from the group consisting of hydrochloric acid, hydrobromic acid, hydroiodic acid, sulfuric acid, nitric acid, phosphoric acid, carboxylic acid, sulfonic acid, perchloric acid, and any combination thereof.

17. The energy storage system of claim 11, wherein the separator is ion permeable membrane selected from polyolefin based membrane, fluoropolymer based membrane, polybenzimidazole based membrane, polyamide based membrane, polysulfone based membrane, polymers of intrinsic microporosity membrane, metal organic framework membrane, covalent organic frameworks membrane, and any combination thereof.

18. The energy storage system of claim 11, wherein the positive electrode comprises a material selected from the group consisting of metal, carbon felt, carbon paper, graphene sheet, conducting polymer, and any combination thereof, and the negative electrode comprises a material selected from the group consisting of metal, carbon felt, carbon paper, graphene sheet, conducting polymer, and any combination thereof.

19. A method for energy storage, comprising using an aqueous redox flow battery, wherein the aqueous redox flow battery comprises a positive electrode, a negative electrode, a posolyte chamber containing a posolyte wherein at least a part of the positive electrode is immersed in a solution of the posolyte, a negolyte chamber containing a negolyte of $H_6P_2W_{18}O_{62}$ wherein at least a part of the negative electrode is immersed in an aqueous solution of the negolyte, and a separator disposed between the posolyte chamber and the negolyte chamber.

* * * * *

UNITED STATES PATENT AND TRADEMARK OFFICE
CERTIFICATE OF CORRECTION

PATENT NO. : 11,881,605 B2
APPLICATION NO. : 17/681016
DATED : January 23, 2024
INVENTOR(S) : Yi-Chun Lu et al.

Page 1 of 1

It is certified that error appears in the above-identified patent and that said Letters Patent is hereby corrected as shown below:

In the Claims

Column 17, Claim 6, Line 36:
"$VO^{2+}/CO_2^+$," should read: --$VO^{2+}/VO_2^+$,--.

Signed and Sealed this
Seventeenth Day of December, 2024

Derrick Brent
*Acting Director of the United States Patent and Trademark Office*